March 21, 1961
C. E. BALKUS ET AL
2,975,579
PLANT THINNING MACHINE
Filed Sept. 12, 1958
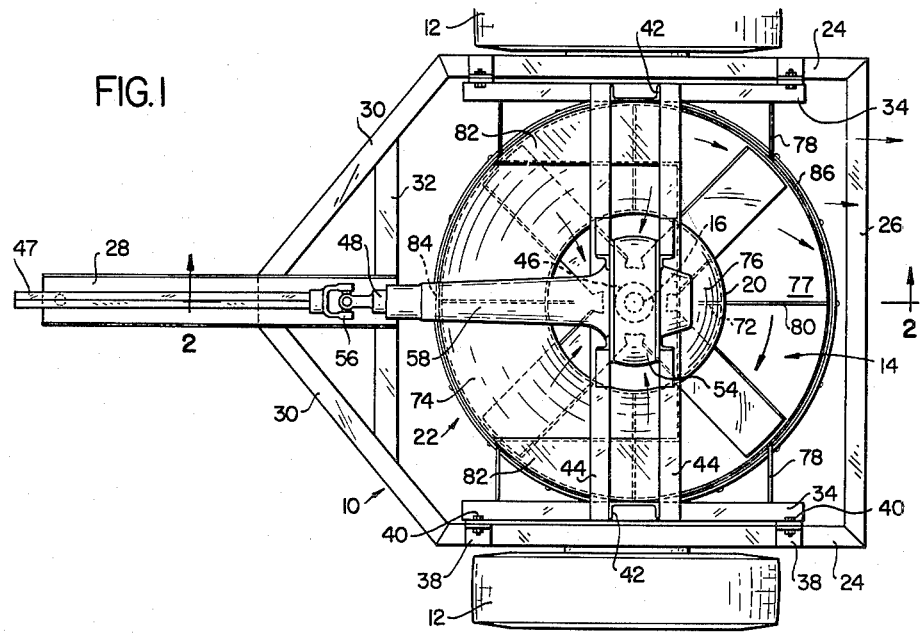
FIG. 1
FIG. 2
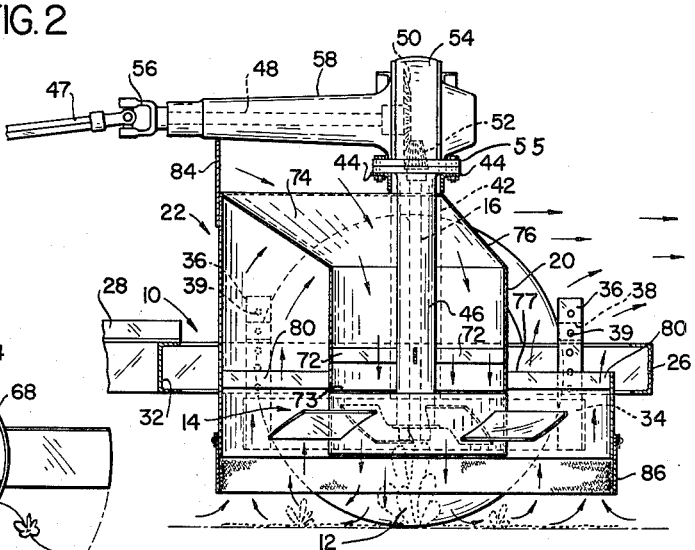
FIG. 3
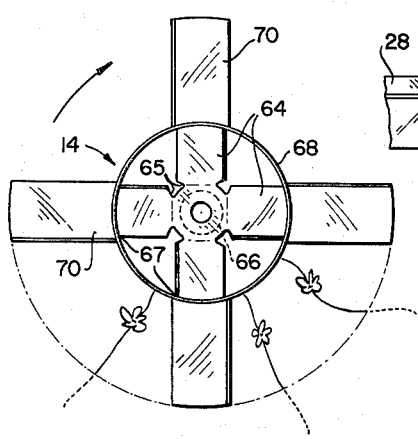
FIG. 4
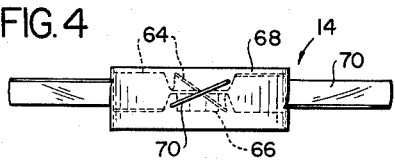
INVENTORS
CARL E. BALKUS
CARL E. BALKUS JR.
JAMES P. BALKUS
BY Teller & McCormick
ATTORNEYS United States Patent Office 2,975,579
Patented Mar. 21, 1961

2,975,579
PLANT THINNING MACHINE
Carl E. Balkus, Carl E. Balkus, Jr., and James P. Balkus, all of Birch Mountain Road, Glastonbury, Conn.
Filed Sept. 12, 1958, Ser. No. 760,685
8 Claims. (Cl. 56—25.4)

This invention relates to plant thinning machines and, more specifically, to a machine particularly adapted to thin strawberry plants.

Strawberry plants are known to send out shoots or runners which take root to form new plants and the new plants, in turn, send out shoots or runners which form additional new plants. If uninterrupted, such multiplication of the strawberry plants results in a crowded condition wherein the development of the larger plants may be seriously retarded so as to detract from the size and quality of the fruit produced. Machines for thinning strawberry plants which have heretofore been available have not been found entirely satisfactory and it is believed that the large majority of strawberry growers presently resort to the costly and time-consuming operation of manually thinning their plants.

The present invention has as its general object the provision of a machine adapted to rapidly and efficiently thin strawberry or other plants in a wholly automatic and mechanical operation during movement of the machine over said plants.

A further object of the invention is to provide a machine of the type mentioned which includes a power driven rotary cutter disposed in a substantially horizontal plane spaced above the surface of the ground, and which also includes means for inducing a flow of air to the space beneath the blades of the cutter, the said blades being shaped to create a substantial up draft of air whereby prone and newly rooted plant growth is raised to an upright position for effective cutting.

A still further and more specific object of the invention is to provide a machine of the type mentioned wherein the means for inducing air flow to the space beneath the blades of the rotary cutter comprises a power driven rotary impeller, and wherein the said cutter and impeller are combined in a single compact rotor unit.

The drawing shows a preferred embodiment of the invention and such embodiment will be described, but it will be understood that various changes may be made from the construction disclosed, and that the drawing and description are not to be construed as defining or limiting the scope of the invention, the claims forming a part of the specification being relied upon for that purpose.

Of the drawing:

Fig. 1 is a plan view of the plant thinning machine of the present invention;

Fig. 2 is a central longitudinal vertical section of the plant thinning machine of Fig. 1 with some portions of the machine shown in elevation;

Fig. 3 is a plan view of a rotor which includes an air impeller section and a cutter section; and Fig. 4 is a side elevation of the rotor of Fig. 3.

The plant thinning machine shown in the drawing and which constitutes the presently preferred embodiment of the invention is adapted to be towed or drawn over the ground by a tractor or the like and is further adapted to be operated by power supplied from the power take-off of the said tractor or the like. The invention, however, is not so limited and as will be apparent from the description which follows.

In general, the plant thinning machine shown comprises a frame indicated generally at 10 which is supported at opposite sides by a pair of ground wheels 12, 12. A first or base section of the frame 10, which is adapted for connection with a tractor or the like, carries the wheel 12, 12 and supports a second frame section which may be moved to a plurality of adjusted vertical positions relative to the said first or base section. A power driven rotary cutter adapted to provide an upward flow of air therethrough is supported by the second frame section and rotates in a substantially horizontal plane spaced above the ground. The said cutter comprises a plurality of cutting blades which form a part of a rotor 14 secured to the lower end portion of a power rotated shaft 16. The shaft 16 extends substantially vertically and is supported by the second section of the frame 10 at approximately the center of the machine. A substantially vertically extending air inlet duct 20 also supported by the second frame section about the shaft 16 is adapted to supply a flow of air to the space beneath the rotary cutter and associated with said duct is a means for inducing air flow downwardly therethrough and toward said space. The flow inducing means comprises a power driven rotary impeller which is shown as including a plurality of horizontally extending impeller blades forming a central part of the rotor 14. A housing 22 which surrounds the rotor 14 has an open bottom for receiving plant growth to be cut and also has an opening in an upper portion thereof for discharging air which is forced upwardly by the rotary cutter.

The frame 10 of the plant thinning machine may take various forms, but is preferably constructed of a plurality of welded together structural members as shown. The first or base section of the said frame comprises a pair of spaced parallel side beams 24, 24 which lie in a horizontal plane and which are connected together at their rear ends by a horizontal crossbeam 26. The wheels 12, 12 are mounted respectively at approximately the mid-points of the beams 24, 24. At their forward ends, the beams 24, 24 are connected to each other and to a forwardly extending central drawbar 28 by a generally triangular structure comprising a pair of similar horizontal beams 30, 30 and a horizontal crossbeam 32. The beams 30, 30 respectively have one end connected to the drawbar 28 and respectively extend rearwardly and outwardly therefrom at substantially equal angles for connection at their opposite ends with the side beams 24, 24. The crossbeam 32 is connected between the ends of the beams 30, 30 and has the rear end of the drawbar 28 connected to a central portion thereof. The forward end of the drawbar 28 is adapted for connection with a tractor or the like.

The second section of the frame 10 which is supported on the above described first or base frame section also includes a pair of spaced parallel side beams. The said side beams, designated by the numeral 34, respectively extend adjacent the side beams 24, 24 of the first or base frame section and are supported by four upright adjusting bars 36, 36. The bars 36, 36 are rigidly secured in longitudinally spaced pairs to the side beams 24, 24 by suitable brackets 38, 38 and each of said bars is provided with a vertically extending series of circular openings 39, 39. Each of the side beams 34, 34 is provided with two circular openings suitably spaced longitudinally for attachment of the beams to said adjusting bars by means of suitable bolts 40, 40. Thus, it will be observed that the side beams 34, 34 are adjustably supported on the first or base frame section, it being apparent that the vertical position of said beams relative to the said first or base frame section may be adjusted as desired by inserting the bolts 40, 40 through appropriate holes 39, 39 in the bars 36, 36. Since, as will be described hereinbelow, the side beams 34, 34 support all of the remaining elements of the machine including the aforementioned rotor 14, adjustment of the vertical position of said beams may be accomplished to establish a desired vertical position of said rotor relative to the plant growth.

Two additional members 42, 42 of the second section of the frame 10 are supported respectively at approximately the mid-points of the side beams 34, 34 and respectively extend vertically upwardly from said beams. At their upper ends, the frame members 42, 42 are connected together by two transversely extending horizontal beams 44, 44. The beams 44, 44 are respectively connected at their ends to opposite sides of the upright members 42, 42 as by welding and are spaced apart longitudinally.

The previously mentioned power rotated vertical shaft 16 which carries the rotor 14 at a lower end portion thereof is journaled in suitable bearings (not shown) within a cylindrical casing 46 which has its upper end disposed in the space between the connecting beams 44, 44. In the embodiment of the invention shown, a power transmitting means adapted for connection with the power take-off unit of a tractor or the like drives the shaft 16 at its upper end, other means for rotating the said shaft, however, being suitable for the purposes of the invention. The power transmitting means shown comprises two shafts 47 and 48 which are connected together in end-to-end relationship and two mating bevel gears 50 and 52 which are disposed in a housing 54 supported on the crossbeams 44, 44. The shaft 47 is adapted for connection at its forward end with the power take-off unit of a tractor or the like. At its rear end, the shaft 47 is connected with the forward end of the shaft 48 through a universal coupling 56 which accommodates misalignment between the said two shafts. The shaft 48 is journaled in suitable bearings (not shown) supported within a forwardly extending projection 58 which is formed integrally on the gear housing 54 and said shaft carries the bevel gear 50 at its rear end. The gear 50 meshes with and drives the bevel gear 52, the said latter gear being secured to the upper end of the vertical shaft 16 which projects into the housing 54 through a suitable opening provided therein. The upper end of the casing 46 for the shaft 16 is rigidly secured to the housing 54 for support as by suitable bolted together mating flanges indicated at 55.

The rotor 14 carried on the lower end of the shaft 16, as mentioned above, includes a central air impeller section and a cutter section. As best illustrated in Figs. 3 and 4, the impeller section preferably comprises four equally circumaxially spaced impeller blades 64, 64 which are formed integrally at their inner ends 65, 65 with a hub 66 adapted to be secured to the shaft 16. The impeller blades 64, 64 extend radially outwardly from the hub 66 and shaft 16 and are shaped to induce air flow downwardly therethrough when rotated about said shaft. At their outer ends 67, 67, the said blades are secured to and support a hoop 68. Rigidly secured to the outer surface of the hoop 68 and extending radially outwardly therefrom are four equally circumaxially spaced cutting blades 70, 70. The blades 70, 70 are shaped to induce air flow upwardly therethrough and constitute the rotor cutter section.

From the foregoing, it will be apparent that the rotor 14 includes a rotary cutter and a rotary air impeller in unitary and compact form and that the said impeller serves as a central supporting means for the cutter through which air is induced to pass downwardly and toward the space beneath the cutter. It is to be understood, however, that the invention is not limited to plant thinning machines wherein a rotary cutter and a rotary air impeller are combined in a single rotor unit, or to machines wherein a flow of air is supplied to the space beneath the cutting blades downwardly through a central supporting means for the said blades.

When the rotary cutter and impeller are combined in a single rotor unit as shown, there is preferably provided means defining a passageway, such as the previously mentioned inlet duct 20, for supplying air to the space above the impeller. It will be observed that the duct 20 is generally cylindrical in form and extends vertically about the shaft 16 and its casing 46. Four equally circumaxially spaced and radially extending tie bars 72, 72 serve to connect the duct 20 to the said casing 46. Preferably the diameter of the duct 20 is substantially equal to the diameter of the hoop 68 and the lower end 73 of said duct is preferably disposed in close proximity to said hoop for supplying air thereto. Secured to the upper end of the duct 20 are baffle members 74 and 76, the construction and function of which will be set forth hereinbelow.

While it is not necessary, it is preferred that the plant thinning machine of the present invention be provided with a housing for the rotary impeller and cutter constituting the rotor 14. The housing 22, mentioned above and described in the drawing, is preferably generally cylindrical in form and is disposed with its axis extending substantially vertically. A lower portion of the housing 22 surrounds the rotor 14 and extends substantially below the plane of rotation thereof toward the ground. As shown, the upper portion of the housing 22 is substantially semi-cylindrical, a rear part of said upper portion defined by a transverse vertical plane spaced slightly rearwardly of the housing axis and by an intersecting horizontal plane spaced above the rotor 14 being removed to provide an opening 77 through which air forced upwardly by the rotor cutting blades 70, 70 may be freely discharged. The bottom of the housing 22 is open for easy access of plant growth to the cutting blades 70, 70.

As shown, the housing 22 is supported by the second frame section and more particularly by four tie bars 78, 78 which are connected between opposite sides of said housing and the side beams 34, 34 in pairs. The said housing may also be secured to said second frame section by suitably welding the upright bars 42, 42 to opposite sides thereof. Four equally circumaxially spaced and radially extending tie bars 80, 80 are shown connecting the housing 22 to the duct 20 which is disposed coaxially therewithin.

The baffle member 74 which is secured to the upper end of the duct 20 is generally semi-conical in form and is disposed in an inverted attitude with its lower end secured to the forward portion of the upper end of the duct 20 as by suitably welding. The upper end of the said baffle member is secured to the forward portion of the upper end of the housing 22 and to two cover plates 82, 82 secured on opposite sides to said housing forward and upper end portion. Also secured to the forward portion of the upper end of the housing 22 is an upright support 84 for the forwardly extending projection 58 of the gear housing 54. The baffle member 76 which is also generally semi-conical is secured in an upright attitude to the rear portion of the upper end of the duct 20 and to the gear crossbeam 44 which connects the two upright members 42, 42.

From the foregoing, it will be apparent that the baffle members 74 and 76 and the cover plates 82, 82 cooperate to define a passageway for introducing atmospheric air to the inlet duct 20 at its upper end. It will be further apparent that air forced upwardly by the cutting blades 70, 70 within the forward portion of the housing 22 will be directed rearwardly around the duct 20 by the baffle member 74 and the said cover plates for discharge to the atmosphere. Thus, commingling of the air flowing to the rotor 14 and the air flowing therefrom is prevented and the continued recirculation of severed plant growth in the machine is avoided.

It has been found that the cutting blades 70, 70 of the rotor 14 tend to draw air radially inwardly beneath the housing 22 and to force the said air upwardly along with the air which flows downwardly through the duct 20 and the impeller blades 64, 64 and then radially outwardly beneath the said cutting blades. Thus, the rising annular column of air developed by the cutting blades comprising a flow of air which is supplied radially outwardly to the space beneath the cutting blades and a flow of air which is supplied radially inwardly to said space. It is believed that the most efficient lifting action on plant runners and the like is obtained when both of said air flows are in close proximity to the surface of the ground so as to pass beneath rather than over said runners and the like. The air flowing downwardly through the duct 20 is urged downwardly by the impeller blades 64, 64 with considerable force and velocity and is thus caused to travel radially outwardly in close proximity to the surface of the ground before being drawn upwardly by the cutting blades 70, 70. The air which flows radially inwardly beneath the housing 22, on the other hand, may tend to flow over rather than under plant runners or the like in the absence of suitable means for constraining the same to a zone immediately adjacent the ground surface. Such constraining means is, therefore, preferably provided and may take the form of a shroud or skirt 86 forming a part of the machine housing and constructed as described hereinbelow.

The shroud or skirt 86 as shown is secured to and depends from the lower edge portion of the housing 22. Canvas or other pliable material is preferably used for the said shroud or skirt so that uneven or undulating ground surfaces encountered during travel of the machine may be readily accommodated. The lower edge of the shroud or skirt 86 extends substantially below the plane of rotation of the rotor 14 and is disposed at a selected distance from the ground surface so that air flowing radially inwardly therebeneath will pass beneath rather than over prone plant growth such as strawberry runners. It is presently contemplated that the lower edge of the shroud or skirt 86 will be spaced approximately 2 to 3 inches above the ground but this distance may, of course, be varied widely within the scope of the invention.

In operation, the plant thinning machine is towed or drawn along a row of strawberry or other plants, the rotor 14 being turned by the shaft 16 and the said shaft in turn being rotated by the power take-off unit of the tractor through the power transmitting means comprising the shafts 47 and 48 and the gears 50 and 52. At this point, it may be mentioned that with a rotor approximately 30 inches in diameter a speed of about 2800 to 3000 r.p.m. is presently considered optimum for the most efficient operation of the machine. Accordingly, the gears 50 and 52 are adapted to provide approximately a 4 to 1 driving ratio, the rotational speed of the usual tractor power take-off unit being about 700 r.p.m.

As the machine is towed or drawn along the row of strawberry or other plants, the impeller blades 64, 64 draw air downwardly through the inlet duct 20 and force the air into the space beneath the cutting blades 70, 70 as described. The cutting blades 70, 70, in turn, force the said air upwardly therethrough along with air drawn radially inwardly beneath the shroud or skirt 86. The two ascending air flows in the area beneath the cutting blades 70, 70 combine to lift the prone plant growth such as strawberry runners along with other plant growth to an upright position. When erect, the plant growth is effectively severed by the cutting blades and is carried upwardly by the rising current of air and exhausted from the machine therewith.

Depending on the vertical position of the rotor 14 above the ground, as determined by the connection of the side beams 34, 34 with the adjusting bars 36, 36, a selected proportion of the undesirable plant growth will be removed or thinned out from the row. A portion of the foliage on the larger plants may, of course, also be severed by the machine, but this does not ordinarily harm the plants and in the case of strawberry plants, removal of a portion of the foliage from the larger plants may tend to accelerate their growth and development and improve the size and quality of the fruit produced. The amount of foliage severed from the larger plants is, of course, also determined by the adjusted vertical position of the rotor 14.

From the foregoing, it will be apparent that a plant thinning machine has been provided which effectively thins strawberry or other plants in a wholly mechanical and automatic manner whereby to achieve substantial savings in labor and time. Obviously, the said machine may be used for a variety of plant cutting operations other than thinning strawberries or the like and it is described as a strawberry thinning machine only for the purpose of best illustrating its advantages.

The invention claimed is:

1. A plant thinning machine comprising in combination, a frame supported on ground wheels, a substantially vertically extending power rotated shaft supported by the frame, a rotary cutter secured to a lower end portion of said shaft for rotation therewith above the ground surface and comprising a central supporting means connected with the shaft and holding a plurality of circumaxially spaced radially extending cutting blades with their respective inner ends spaced from said shaft, said supporting means being adapted to accommodate a flow of air downwardly therethrough inwardly of the inner ends of said cutting blades and toward the space beneath said blades, and said cutting blades being shaped to induce air flow upwardly therethrough whereby to lift prone plant growth to an upright position for cutting, means supported by the frame defining an air passageway having its discharge end disposed above said cutter supporting means, and a power driven rotary impeller associated with said air passageway for inducing air flow therethrough and through said cutter supporting means for supply to the space beneath said cutting blades.

2. A plant thinning machine comprising in combination, a frame supported on ground wheels, a substantially vertically extending power rotated shaft supported by the frame, a rotary cutter secured to a lower end portion of said shaft for rotation therewith in a substantially horizontal plane above the ground surface and comprising a central supporting means connected with the shaft and holding a plurality of circumaxially spaced radially extending cutting blades with their respective inner ends spaced from said shaft, said supporting means being adapted to accommodate a flow of air downwardly therethrough inwardly of inner ends of said cutting blades and to the space beneath said blades, and said cutting blades being shaped to induce air flow upwardly therethrough whereby to lift prone plant growth to an upright position for cutting, means supported by the frame defining an air passageway having its discharge end disposed above said cutter supporting means, a power driven rotary impeller associated with said air passageway for inducing air flow therethrough and through said cutter supporting means for supply to the space beneath said cutting blades, and a housing for the rotary cutter open at the bottom and provided with an opening in an upper portion thereof for the free discharge of air forced upwardly by said cutter, said housing extending substantially below the plane of rotation of said cutter toward the ground surface so that air drawn radially inwardly therebeneath by the said cutting blades will be constrained to a zone immediately adjacent the ground surface.

3. A plant thinning machine comprising in combination, a frame supported on ground wheels, a substantially vertically extending power rotated shaft supported by the frame, a plurality of circumaxially spaced impeller blades shaped to induce air flow downwardly thereover respectively connected at their inner ends with a lower end portion of said shaft and respectively extending substantially radially outwardly from said shaft lower end portion for rotation therewith in a substantially horizontal plane spaced above the ground surface, a hoop extending around said impeller blades at their outer ends and attached to said blades at its inner surface so as to be supported thereby and rotated therewith, and a plurality of circumaxially spaced cutting blades shaped to induce air flow upwardly thereover respectively secured at their inner ends to the outer surface of said hoop and respectively extending substantially radially outwardly from said hoop for rotation therewith.

4. A plant thinning machine comprising in combination, a frame supported on ground wheels, a substantially vertically extending power rotated shaft supported by the frame, a plurality of circumaxially spaced impeller blades shaped to induce air flow downwardly thereover respectively connected at their inner ends with a lower end portion of said shaft and respectively extending substantially radially outwardly from said shaft lower end portion for rotation therewith in a substantially horizontal plane spaced above the ground surface, a hoop extending around said impeller blades at their outer ends and attached to said blades at its inner surface so as to be supported thereby and rotated therewith, a plurality of circumaxially spaced cutting blades shaped to induce air flow upwardly thereover respectively secured at their inner ends to the outer surface of said hoop and respectively extending substantially radially outwardly from said hoop for rotation therewith, and a cylindrical air inlet duct having a diameter substantially equal to the diameter of the hoop disposed about the vertical shaft in coaxial relation therewith and with its lower end in close proximity to said hoop.

5. A plant thinning machine comprising in combination, a frame supported on ground wheels, a substantially vertically extending power rotated shaft supported by the frame, a plurality of circumaxially spaced impeller blades shaped to induce air flow downwardly thereover respectively connected at their inner ends with a lower end portion of said shaft and respectively extending substantially radially outwardly from said shaft lower end portion for rotation therewith in a substantially horizontal plane spaced above the ground surface, a hoop extending around said impeller blades at their outer ends and attached to said blades at its inner surface so as to be supported thereby and rotated therewith, a plurality of circumaxially spaced cutting blades shaped to induce air flow upwardly thereover respectively secured at their inner ends to the outer surface of said hoop and respectively extending substantially radially outwardly from said hoop for rotation therewith, and a housing around the aforesaid cutting blades extending substantially below the plane of rotation of said blades toward the ground surface so that air drawn radially inwardly therebeneath by the said cutting blades will be constrained to a zone immediately adjacent the ground surface, said housing being open at the bottom and having an opening in an upper portion thereof for the free discharge of air forced upwardly by said cutting blades.

6. A plant thinning machine comprising in combination, a frame supported on ground wheels and including a base section on which the wheels are mounted and a second section which is supported by the base section and which may be moved to several different vertical positions relative to said base section, a substantially vertically extending power rotated shaft supported by the second frame section, a plurality of circumaxially spaced impeller blades shaped to induce air flow downwardly thereover respectively connected at their inner ends with a lower end portion of said shaft and respectively extending substantially radially outwardly from said shaft lower end portion for rotation therewith in a substantially horizontal plane spaced above the ground surface, a hoop extending around said impeller blades at their outer ends and attached to said blades at its inner surface so as to be supported thereby and rotated therewith, and a plurality of circumaxially spaced cutting blades shaped to induce air flow upwardly thereover respectively secured at their inner ends to the outer surface of said hoop and respectively extending substantially radially outwardly from said hoop for rotation therewith.

7. A plant thinning machine adapted to be towed by a tractor or the like and comprising in combination, a frame supported on wheels and provided with a drawbar for connection with a tractor or the like, power transmitting means supported by the frame and adapted for connection with the power take-off unit of the tractor or the like, a substantially vertically extending shaft supported by the frame and connected with and driven by the power transmitting means, a plurality of circumaxially spaced impeller blades adapted to induce air flow downwardly thereover respectively connected at their inner ends with a lower end portion of said shaft and respectively extending substantially radially outwardly from said shaft lower end portion for rotation therewith in a substantially horizontal plane spaced above the ground surface, a hoop extending around said impeller blades at their outer ends and attached to said blades at its inner surface so as to be supported thereby and rotated therewith, and a plurality of circumaxially spaced cutting blades shaped to induce air flow upwardly thereover respectively secured at their inner ends to the outer surface of said hoop and respectively extending substantially radially outwardly from said hoop for rotation therewith.

8. A plant thinning machine adapted to be towed by a tractor or the like and comprising in combination, a frame having a base section which is supported on wheels and provided with a drawbar for connection with a tractor or the like and a second section which is supported by the first section and which may be moved to a plurality of vertical positions relative to said base section, power transmitting means supported by the frame second section and adapted for connection with the power take-off unit of the tractor or the like, a substantially vertically extending shaft supported by the frame second section and connected with and driven by the power transmitting means, a plurality of circumaxially spaced impeller blades shaped to induce air flow downwardly thereover respectively connected at their inner ends with a lower end portion of said shaft and respectively extending substantially radially outwardly from said shaft lower end portion for rotation therewith in a substantially horizontal plane spaced above the ground surface, a hoop extending around said impeller blades at their outer ends and attached to said blades at its inner surface so as to be supported thereby and rotated therewith, a plurality of circumaxially spaced cutting blades shaped to induce air flow upwardly thereover respectively secured at their inner ends to the outer surface of said hoop and respectively extending substantially radially outwardly from said hoop for rotation therewith, a cylindrical air inlet duct having a diameter substantially equal to the diameter of the hoop supported by the frame section about the vertical shaft in coaxial relation therewith and with its lower end in close proximity to said hoop, and a housing supported by the frame second section around the aforementioned cutting blades and extending substantially below the plane of rotation of said blades toward the ground surface so that air drawn radially inwardly therebeneath by the said cutting blades will be constrained to a zone immediately adjacent the ground surface, said housing being open at the bottom and having an opening in an upper portion thereof for the free discharge of air forced upwardly by said cutting blades.

References Cited in the file of this patent

UNITED STATES PATENTS

| | | |
|---|---|---|
| 1,336,257 | Muzzy | Apr. 6, 1920 |
| 2,557,598 | Daggett | June 19, 1951 |
| 2,760,327 | Bovee | Aug. 28, 1956 |
| 2,766,573 | Shewmon | Oct. 16, 1956 |
| 2,821,831 | Thompson | Feb. 4, 1958 |
| 2,924,058 | Brooks | Feb. 9, 1960 |